(12) United States Patent
Wang

(10) Patent No.: US 10,581,320 B2
(45) Date of Patent: Mar. 3, 2020

(54) DIRECT FILTERING TYPE SWITCHING POWER SUPPLY

(71) Applicant: MORNSUN GUANGZHOU SCIENCE & TECHNOLOGY CO., LTD., Guangzhou, Guangdong (CN)

(72) Inventor: Baojun Wang, Guangdong (CN)

(73) Assignee: MORNSUN GUANGZHOU SCIENCE & TECHNOLOGY CO., LTD., Guangzhou, Guangdong (CN)

( * ) Notice: Subject to any disclaimer, the term of this patent is extended or adjusted under 35 U.S.C. 154(b) by 99 days.

(21) Appl. No.: 16/070,776

(22) PCT Filed: Aug. 24, 2016

(86) PCT No.: PCT/CN2016/096529
§ 371 (c)(1),
(2) Date: Jul. 17, 2018

(87) PCT Pub. No.: WO2017/124744
PCT Pub. Date: Jul. 27, 2017

(65) Prior Publication Data
US 2019/0020270 A1 Jan. 17, 2019

(30) Foreign Application Priority Data
Jan. 21, 2016 (CN) .......................... 2016 1 0040060

(51) Int. Cl.
*H02M 1/42* (2007.01)
*H05B 33/08* (2020.01)
(Continued)

(52) U.S. Cl.
CPC ........... *H02M 1/42* (2013.01); *H02M 1/4241* (2013.01); *H02M 1/4258* (2013.01);
(Continued)

(58) Field of Classification Search
None
See application file for complete search history.

(56) References Cited

U.S. PATENT DOCUMENTS

| | | | | |
|---|---|---|---|---|
| 2011/0169416 | A1* | 7/2011 | Hsieh ................. | H05B 33/0815 315/219 |
| 2014/0175994 | A1* | 6/2014 | Fujimura ............... | H01S 5/042 315/186 |
| 2017/0311401 | A1* | 10/2017 | Huang ............... | H05B 33/0818 |

FOREIGN PATENT DOCUMENTS

| | | |
|---|---|---|
| CN | 102594175 | 7/2012 |
| CN | 103390879 | 11/2013 |

(Continued)

OTHER PUBLICATIONS

"International Search Report (Form PCT/ISA/210)", dated Nov. 29, 2016, with English translation thereof, pp. 1-6.

*Primary Examiner* — Jue Zhang
*Assistant Examiner* — Henry E Lee, III
(74) *Attorney, Agent, or Firm* — JCIPRNET

(57) ABSTRACT

A direct filtering type switching power supply is provided, for an occasion including pulsating direct current, including a filter circuit, a main power stage and an indicating circuit. A direct current input is connected to the filter circuit through the indicating circuit. The filter circuit and the main power stage are connected in parallel. The indicating circuit is formed by connecting a light emitting unit with an inductor in parallel, and make sure that the direction of the direct current input passing through the inductor is opposite to the conducting direction of the light emitting unit. The filter circuit at least includes an electrolytic capacitor. When the electrolytic capacitor is normal, an excitation current of a switching transistor in the main power stage basically does not appear in the inductor, and an LED in the light emitting unit does not emit light. When the Equivalent Series Resis- (Continued)

tance of the electrolytic capacitor rises greatly, the excitation current of the switching transistor appears in the inductor. Furthermore, when the switching transistor is switched off, the excitation current flowing through the inductor, which cannot be changed abruptly, freewheels through the LED, and drives the LED to emit light, so as to notify a user or a circuit that the electrolytic capacitor may have the risk of complete failure. The LED may also be a light emitter of a photocoupler. The switching power supply is low in cost, has unchanged efficiency and is easy to implement.

20 Claims, 22 Drawing Sheets

(51) Int. Cl.
*H02M 3/335* (2006.01)
*H02M 7/217* (2006.01)

(52) U.S. Cl.
CPC ........... *H02M 3/335* (2013.01); *H02M 7/217* (2013.01); *H05B 33/0803* (2013.01); *H05B 33/0815* (2013.01); *Y02B 70/126* (2013.01)

(56) References Cited

FOREIGN PATENT DOCUMENTS

| | | |
|---|---|---|
| CN | 103605084 | 2/2014 |
| CN | 105491728 | 4/2016 |
| CN | 105527524 | 4/2016 |
| CN | 105577003 | 5/2016 |
| CN | 105676936 | 6/2016 |
| CN | 105676937 | 6/2016 |
| CN | 205490207 | 8/2016 |
| CN | 205491305 | 8/2016 |
| JP | 2012142132 | 7/2012 |

\* cited by examiner

DIRECT FILTERING TYPE SWITCHING POWER SUPPLY

CROSS-REFERENCE TO RELATED APPLICATION

This application is a 371 application of the international PCT application serial no. PCT/CN2016/096529, filed on Aug. 24, 2016, which claims the priority benefit of China application no. 201610040060.5, filed on Jan. 21, 2016. The entirety of each of the abovementioned patent applications is hereby incorporated by reference herein and made a part of this specification.

BACKGROUND

Technical Field

The present application relates to the field of switching power supplies, and more particularly relates to a high-reliability switching power supply which converts alternating current or direct current into direct current.

Description of Related Art

At the present, switching power supplies are widely applied. Under condition where input power should be less than 75 W and no requirements are made to Power Factors (PF), fly-back switching power supplies have the advantages of having simple circuit topology and wide input voltage range. Due to small number of elements and hence relatively high circuit reliability, they are widely applied. For the purpose of convenience, these switching power supplies are also called fly-back switching power supplies and fly-back power supplies in the literature, and are called fly-back converters in Japan and Taiwan. Common topology is as shown in FIG. 1, which is from page 60 of *Topology and Design of Power Converter of Switching Power Supply* ISBN978-7-5083-9015-4 written by Dr. Zhang Xingzhu, and this book is Reference 1 in this description for short. The switching power supply consists of a rectifying bridge 101, a filter circuit 200 and a basic fly-back topology unit circuit 300 which is known as a main power stage for short. In a practical circuit, protective circuits such as a voltage dependent resistor, an NTC (Negative Temperature Coefficient) thermistor and an EMI (Electromagnetic Interference) protective circuit are also additionally arranged in front of the rectifying bridge, so as to ensure that the electromagnetic compatibility of the fly-back power supply meets a use requirement.

The rectifying bridge 101 generally consists of four rectifying diodes. FIG. 4-1, FIG. 4-2 and FIG. 4-3 in the description of a granted invention No. 201210056555.9 provide several publically known drawing methods of the rectifying bridge. The filter circuit 200 generally consists of an electrolytic CL. To make the EMI performance stand out, a high-voltage low-capacitance capacitor having a good high frequency characteristic is generally connected in parallel to two ends of the electrolytic CL. The main power stage 300 includes many devices, but only a power transformer B, a main power switching transistor V which is generally an MOS (Metal Oxide Semiconductor) transistor, an output rectifying diode D and an output filter capacitor C are listed here. The power transformer B in the fly-back topology is actually an energy storage inductor. The main power stage 300 actually also includes many circuits, such as a DCR circuit for absorbing inverse peak voltage of the MOS transistor, a PWM (Pulse Width Modulation) control circuit, a photocoupler feedback circuit and even an active clamping circuit. The main topology of the main power stage 300 is not limited to a fly-back circuit, and also may be a two-transistor fly-back circuit, a half-bridge converter and the like.

With the rise of direct current power supplying, for example, with the popularization of solar energy and wind power generation equipment, high-voltage direct current power supplying starts to be popularized, and such a phenomenon that a fly-back power supply is used as a standby power supply of a system also comes up. In the basic topology in FIG. 1, the rectifying bridge 101 is eliminated to realize the direct current power supplying, but some people prefer the direct current power supplying from the front end of the rectifying bridge 101. Although this method is slightly lower in efficiency, both alternating current and direct current may be used, and it does not need to distinguish the anode and the cathode during direct current power supplying.

Many manufacturers in China do not follow the national standard completely. Some application fields having the input power exceeding 75 W, such as a power supply of a desktop computer, which has the power exceeding 150 W or higher, also adopt the topology similar to that in FIG. 1. Most of the main power stages 300 adopt two-transistor forward which is a popular term in the industry, and actually means a half-bridge converter. No power factor correction inductor is connected in series into the rectifying bridge 101, namely after rectification and filtering are completed, power is supplied to the half-bridge converter.

Even if a power factor correction inductor is connected in series into the rectifying bridge 101, the rectifying bridge still belongs to passive filtering type power factor correction instead of active power factor correction. A switching power supply which carries out filtering after being rectified and a switching power supply in which the power factor correction inductor is first connected in series into the rectifying bridge and then the filtering is carried out are both defined as: direct filtering type switching power supplies.

The filter circuit 200 generally consists of the electrolytic capacitor CL. For the purpose of convenience, "electrolytic capacitor" is called "electrolytic" for short below. With the popularization of intelligent systems in the industrial field, the disadvantages of switching power supplies using the electrolytic have been exposed accordingly. Because of the use of the electrolytic CL, its characteristics limit the use of the switching power supply. The low and high-temperature service lives of the electrolytic capacitor has always been a problem in the industry. It is known to all that the capacitor CL is generally an electrolytic capacitor having the withstand voltage of 400 V, but an electrolytic capacitor having the withstand voltage higher than 250 V usually only works at a temperature down to −25 DEG C. That is to say, under an environment with a temperature of −40 DEG C., such as three provinces in the northeast of China, Xinjiang, and countries and regions at high latitudes, the use of the switching power supply becomes difficult. Of course, a CBB thin film capacitor may be used for realizing filtering, but it is extremely large in volume and extremely high in cost.

With extremely high capacitance per unit volume, the electrolytic capacitor is still a low-cost solution for switching power supplies having fly-back power supplies, particularly in the field of inputting of alternating current at the present, and is mostly applied to various power supplies. For example, switching power supplies are used in various mobile phone chargers, notebook computer adapters, power supplies of various color TVs, power supplies of desk computers, standby power supplies of air conditioners and the like, and therefore, the electrolytic capacitor is also used.

During design of one switching power supply, the problem on the service life of the electrolytic CL often comes up. In actual use, many switching power supplies does not achieve the rated service lifetime, and it is mainly because their electrolytic capacitors for filtering fail in advance. On many occasions having relatively high requirements, a redundant design is adopted, namely two switching power supplies are used as mutual spares. If one switching power supply is broken, normal function is maintained, but the cost is relatively high, and it is inconvenient to prepare spares because one still cannot know when the other switching power supply would fail.

On a common non-redundant design occasion, the failure of the switching power supply may link to other failures, so that the loss would be increased. Statistically, the failure of a qualified switching power supply is 97 percent or above caused by the first failure of the electrolytic capacitor for filtering.

The existing switching power supply using the electrolytic capacitor cannot effectively forecast the failure of the electrolytic capacitor.

SUMMARY OF THE INVENTION

In view of this, in order to solve the shortcomings of an existing direct filtering type switching power supply using an electrolytic capacitor for filtering, the present application provides a direct filtering type switching power supply which may provide indication before an electrolytic capacitor for filtering fails completely, so as to realize forecasting before the switching power supply fails completely.

The objective of the present application is realized as follows: a direct filtering type switching power supply, for direct current input including pulsating direct current, including a filter circuit, a main power stage, and an indicating circuit having two terminals. The direct current input is connected to the filter circuit through the indicating circuit, and the filter circuit is connected in parallel with the main power stage. The direct filtering type switching power supply is characterized in that the indicating circuit is formed by connecting a light emitting unit having unidirectional conductivity with a first inductor in parallel, and ensuring that the cunent direction of the direct current input passing through the first inductor is opposite to the conducting direction of the light emitting unit.

Preferably, the direct filtering type switching power supply further includes a rectifying bridge, and is characterized in that the filter circuit at least includes an electrolytic capacitor;

preferably, the direct filtering type switching power supply further includes a rectifying bridge, and is characterized in that the first inductor is a filter inductor for increasing a power factor;

preferably, the direct filtering type switching power supply is characterized in that the light emitting unit is a light emitting diode;

preferably, the direct filtering type switching power supply is characterized in that the light emitting unit is formed by connecting a light emitting diode with a diode in series in the same direction;

preferably, the direct filtering type switching power supply is characterized in that the light emitting unit is formed by connecting a light emitting diode, a diode and a first resistor in series in the same direction;

preferably, the direct filtering type switching power supply is characterized in that the light emitting unit includes a light emitting diode, a diode, a first resistor and a first capacitor. A connection relation is as follows: the light emitting diode and the resistor are connected in series, and then are connected in parallel with the first capacitor to form a third network which is then connected in series with the diode in the same direction to form the light emitting unit;

preferably, the direct filtering type switching power supply is characterized in that the non-isolation solution above and an isolation solution below further include a second resistor which is connected in parallel to two ends of the light emitting diode;

preferably, the direct filtering type switching power supply is characterized in that in all the non-isolation solution above and the isolation solution below, a second capacitor is further included, which is connected in parallel with a direct current power supply.

preferably, the direct filtering type switching power supply is characterized in that in the non-isolation solution above and the isolation solution below, the light emitting diode is a light emitter in a photocoupler, namely a light emitting diode in the photocoupler.

The present application further provides another direct filtering type switching power supply which realizes an isolation function of an indicating circuit. The indicating circuit includes a first terminal, a second terminal, a first transformer and a first light emitting diode. The first transformer at least includes a primary winding and a secondary winding; the first light emitting diode is connected in parallel with the secondary winding of the first transformer; the terminal, which is connected with the cathode of the first light emitting diode, of the secondary winding is used as a dotted terminal; the corresponding dotted terminal of the primary winding is used as the first terminal; the other terminal of the primary winding is used as the second terminal; and the indicating circuit ensures that the current input by the direct current flows in through the first terminal, then flows through the primary winding, and flows out from the second terminal.

Preferably, the direct filtering type switching power supply provided by the present application further includes a first diode. A correction relation is as follows: the first diode is connected in series with the first light emitting diode in the same direction to form a first network; the first network is connected in parallel with the secondary winding of the first transformer, and the terminal, which is connected with the cathode of the first network, of the secondary winding is used as a dotted terminal; and the corresponding dotted terminal of the primary winding is used as the first terminal, and the other terminal of the primary winding is used as the second terminal.

Preferably, the direct filtering type switching power supply provided by the present application further includes a first resistor. A connection relation is as follows: the first diode, the first light emitting diode and the first resistor are connected in series in the same direction to form a second network; the second network is connected in parallel with the secondary winding of the first transformer, and the terminal, which is connected with the cathode of the second network, of the secondary winding is used as a dotted terminal; and the corresponding dotted terminal of the primary winding is used as the first terminal, and the other terminal of the primary winding is used as the second terminal.

Preferably, the direct filtering type switching power supply provided by the present application further includes a first capacitor. A connection relation is as follows:

the first light emitting diode and the first resistor are connected in series, and then are connected in parallel with the first capacitor to form a third network which is then connected in series with the first diode in the same direction to form a fourth network; the fourth network is connected in parallel with the secondary winding of the first transformer, and terminal, which is connected with the cathode of the fourth network, of the secondary winding is used as a dotted terminal; and the corresponding dotted terminal of the primary winding is used as the first terminal, and the other terminal of the primary winding is used as the second terminal.

The working principle will be described in detail in combination with embodiments.

The present application has the beneficial effects as follows:

the cost is extremely low, and the additionally arranged indicating circuit is low in loss, which nearly has no influence on the efficiency of the original converter. The direct filtering type switching power supply is simple in wiring, small size and convenient to use. Moreover, the direct filtering type switching power supply also has the advantages which do not exist in the prior art: before the electrolytic capacitor fails, the light emitting diode of an indicating lamp emits light or current flows through the light emitting diode in the photocoupler, and the photocoupler outputs an isolated signal to notify a user or a circuit.

DETAILED DESCRIPTION OF THE EMBODIMENTS

First Embodiment

Figure 1:
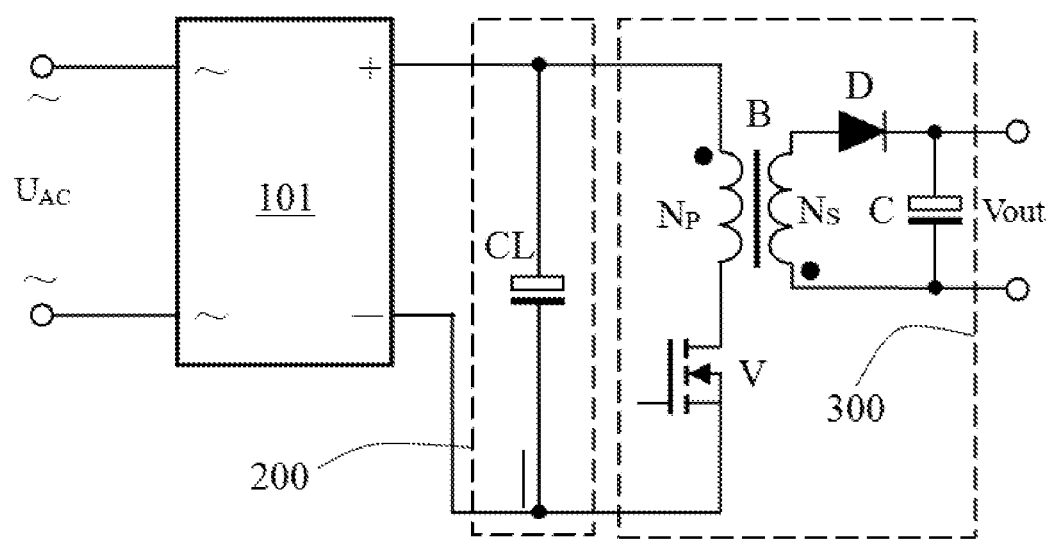
FIG. 1 is a schematic diagram of an existing fly-back switching power supply for converting alternating current into direct current.
Figure 2:
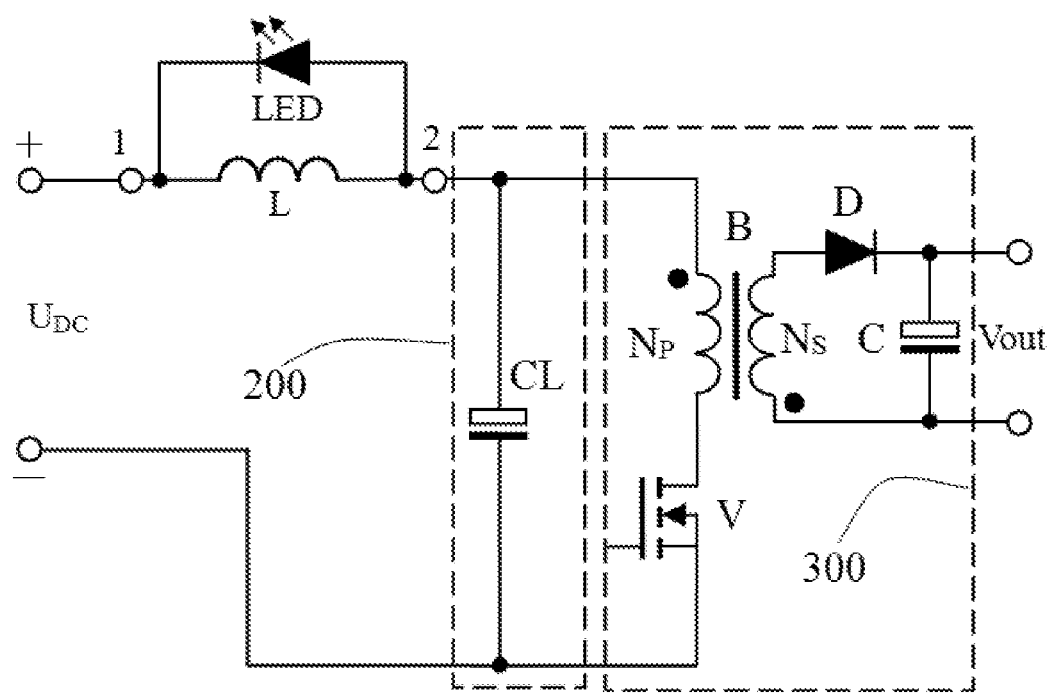
FIG. 2 is a schematic diagram of a direct filtering type switching power supply of a first embodiment of the present application.

FIG. 2 shows a schematic diagram of a direct filtering type switching power supply of a first embodiment of the present application. A direct filtering type switching power supply for direct current input that including pulsating direct current. The direct current input is represented by $U_{DC}$. The direct filtering type switching power supply includes a filter circuit 200, a main power stage 300, and an indicating circuit having two terminals 1 and 2. The direct current input $U_{DC}$ is connected to the filter circuit 200 through the indicating circuit, and the filter circuit 200 is connected in parallel with the main power stage 300. The direct filtering type switching power supply is characterized in that the indicating circuit is formed by connecting a light emitting unit with a first inductor L in parallel, and ensures that the current direction of the direct current input $U_{DC}$ passing through the first inductor L is opposite to the conducting direction of the light emitting unit. The light emitting unit has two terminals, and has unidirectional conductivity. The light emitting unit here is only a light emitting diode LED which has the unidirectional conductivity. The cathode of the light emitting diode LED is connected to the current in-flow terminal of the first inductor L, namely to the terminal 1 of the indicating circuit in the figure, and the anode of the light emitting diode LED is connected to the current flow-out terminal of the first inductor L, namely to the terminal 2 of the indicating circuit in the figure, thereby according with the condition that: the current direction of the direct current input $U_{DC}$ passing through the first inductor L is opposite to the conducting direction of the light emitting unit.

The filter circuit 200 is connected in parallel with the main power stage 300. During parallel connection, reverse connection is not allowed. It is a basic skill for a person skilled in the art to make sure that the main power stage is not connected reversely;

the light emitting diode LED is a Φ3 mm high brightness red light emitting diode. For convenience, the light emitting diode is LED for short, with model number 3AR2UD. The inductor adopts a 15 uH I-shaped, make sure that low-frequency pulsating direct current for charging flows into the indicating circuit from the first terminal 1 and then flows out from the second terminal 2, and also make sure that excitation current of the main power stage of a fly-back power supply does not directly pass through the indicating circuit, so that it is a fool-proofing indication to avoid a lead wire of the electrolytic capacitor CL from being left too long.

The main power stage adopts a main power stage LH25-10B12 produced by the MORNSUN Guangzhou Science & Technology Co. Ltd. The electrolytic capacitor for filtering is 47 uF/400 V, which is a domestically made high-quality capacitor. If the rectifying bridge is removed, the working frequency of the main power stage is 65 KHz. Under the direct current input of 300 VDC, the maximum full-load duty ratio is 0.24.

After the first embodiment is electrified, indexes of all aspects are all the same as those in the prior art (equivalent to the prior art after the inductor L is shorted) according to actual measurement. Particularly, the conversion efficiency has no visible reduction, and the LED does not emit light.

To verify that the present application can work, the inventor adopts a novel method to test the first embodiment: due to difficulty in finding a failed electrolytic capacitor, an adjustable resistor is connected in series into the electrolytic capacitor for filtering to simulate an electrolytic capacitor with lowered performance. The resistance value of the adjustable resistor may be adjusted within a range of 0 to 39Ω here. When the resistance value of the adjustable resistor is adjusted to 5Ω, the ESR of the electrolytic capacitor at 47 uF/400 V has risen to 5.5Ω from the qualified 0.5Ω equivalently, and the electrolytic capacitor is on the edge of failure.

At this time, the LED in FIG. 2 emits light, and an average value of the working cunent is 0.9 mA according to actual measurement. The indicating sensitivity is initially adjusted by selecting inductors L having different inductances. Low inductance of the inductor L leads to low sensitivity, and the high inductance of the inductor L leads to high the sensitivity. During light emitting of the LED, there is a forward voltage drop of 1.6 to 2.2 V, so that the sensitivity may be completely adjusted by connecting a resistor to the two ends of the LED in parallel. In this embodiment, if the resistor of 1.6 K is adopted, voltage generated by current of 1 mA or below at two ends of the parallel-connected resistor is 1.6 V or below, and at this time, the LED does not emit light.

Remarks: the conducting voltage drop of a white-light LED is about 3.0 V, and a red one and a green one will have different voltage drops. The conducting voltage drop of a light emitter inside the photocoupler is about 1.1 V.

Therefore, after the performance of the electrolytic capacitor is reduced, the LED may emit light, indicating that the current of the LED flows from the anode of the LED to the cathode, namely in FIG. 2, there is one current flowing from the terminal 2 to the terminal 1 through the LED.

Remarks: before this application, persons skilled in the art think that the electrolytic capacitor still has a filter function when its ESR rises to the failure edge, so that it is impossible to generate current in such a flowing direction. However, these persons have ignored a very subtle factor that the freewheeling current in the inductor L may generate a voltage drop on the ESR at the moment that a main power switching transistor V is changed from a conducting state into a switched off state. The inventor makes use of this voltage drop to drive the LED to be an indicating lamp. Whereas, before the present application, the persons skilled in the art must adopt a complicated online detection circuit in order to achieve the objective of the present application, and it is inevitable that introducing that technical solution into the switching power supply will cause defects such as reduction of the efficiency, and increase the size and cost of a product.

Figure 3:
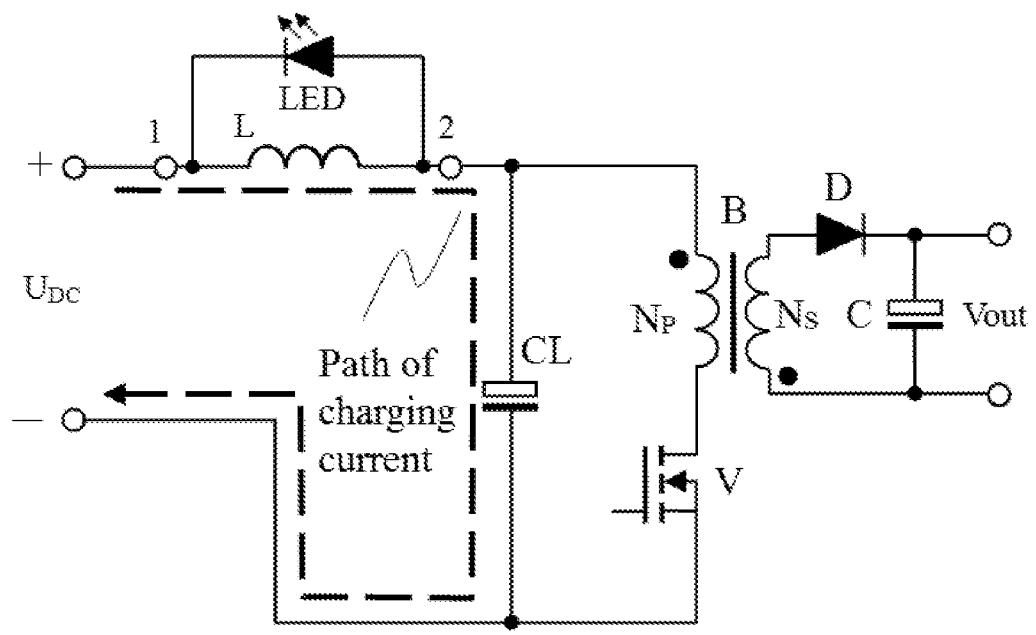
FIG. 3 is a schematic diagram of a path of charging current generated by direct current input $U_{DC}$ to an electrolytic capacitor in the first embodiment.

The working principle firstly put forward by the inventor of the application will be described below to describe where this current is from:

With reference to FIG. 2, when the electrolytic capacitor CL is normal, the current of the direct current input $U_{DC}$ supplements electric energy to the electrolytic capacitor CL through the inductor L, and the path of the charging current of the direct current input $U_{DC}$ is as shown in FIG. 3: flowing from the positive end of the direct current input $U_{DC}$ to the first terminal of the indicating circuit, flowing out from the second terminal of the indicating circuit to the anode of the electrolytic capacitor CL for filtering, and flowing out from the cathode of the electrolytic capacitor CL to the negative end of the direct current input $U_{DC}$.

In this process, the charging current is direct current, and the inductive reactance of the inductor L to the direct current is zero; even if the direct current input $U_{DC}$ is converted into bridge-rectified pulsating direct cunent, the frequency of the charging current of the pulsating direct current is 100 or 120 Hz, which is twice the mains supply; and the inductor L is 15 uH, with the inductive reactance of $2\pi fL$, which is only 11.3 mΩ The LED is in reversal of biasing, and does not emit light.

Figure 4:
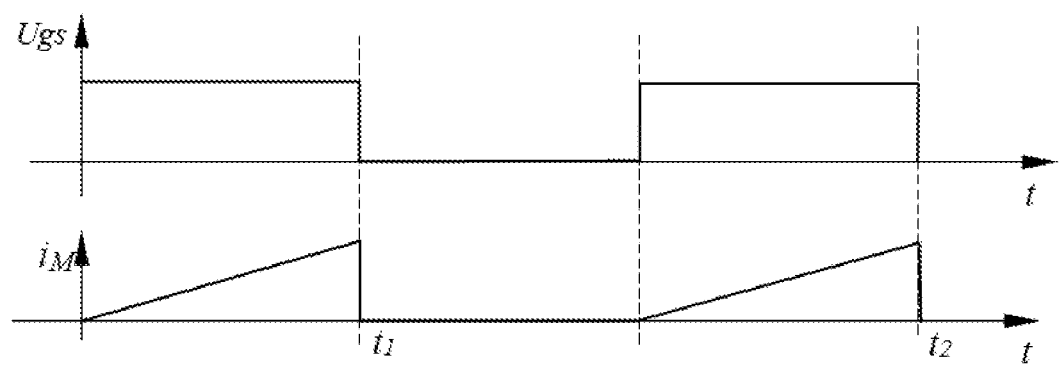
FIG. 4 is a sequence chart of driving voltage and excitation current of a switching transistor of a main power stage in the first embodiment.
Figure 5:
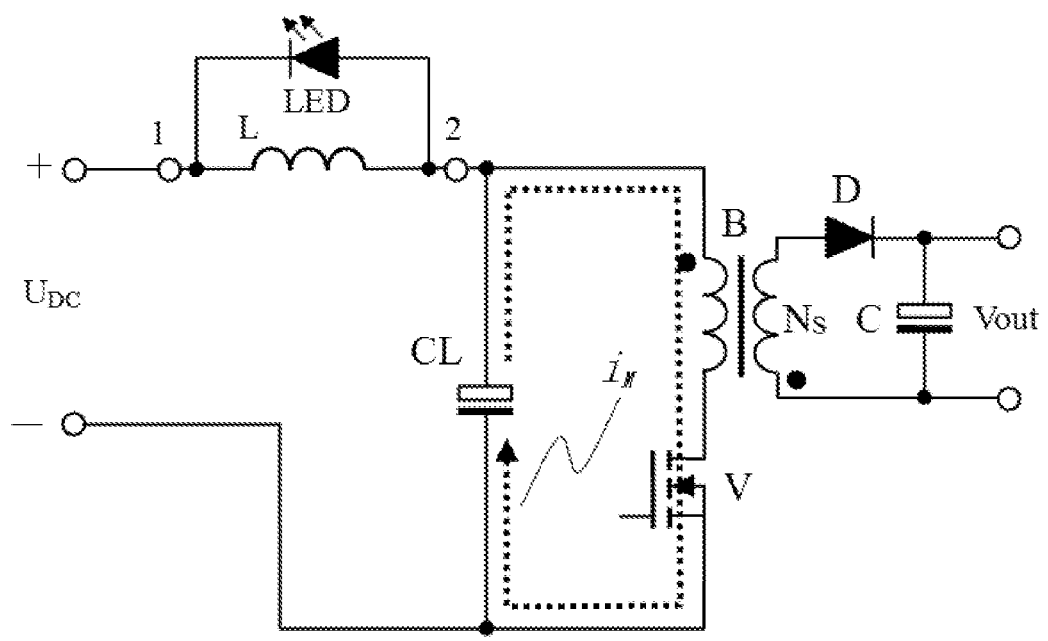
FIG. 5 is a schematic diagram of a path of excitation current $i_M$ of the main power stage when the electrolytic capacitor is normal in the first embodiment.

When the electrolytic capacitor CL is normal, such as the above-mentioned electrolytic capacitor at 47 uF/400 V, its ESR (Equivalent Series Resistance) under 65 KHz is 0.5Ω, namely when a switching transistor V works normally, the waveform of excitation current $i_M$ of the main power stage is as shown in FIG. 4, wherein Ugs is a driving voltage of the gate electrode and the source electrode of the switching transistor V. The path of the excitation current $i_M$ is as shown in FIG. 5. Discharging current of the electrolytic CL to the main power stage is also the excitation cunent $i_M$ of the main power stage.

The capacitive reactance of the electrolytic capacitor CL under 65 KHz is $1/(2\pi fC)$, which is calculated as 52 mΩ and is much less than the ESR. Under 65 KHz, the ESR plays the leading role, and the inductive reactance of the inductor L is 6.1Ω.

Supposing that the internal resistance of the direct current input $U_{DC}$ is zero or extremely low, for the high-frequency discharging current at 65 KHz, the total reactance $R_{ALL}$ seen from the inductor L is not less than 6.1Ω, but the actual total reactance is higher because this is just an estimation. It is very complicated to calculate the compound reactance. Particularly, the waveform as shown in FIG. 4 is not a sine wave, but its fundamental wave is the sine wave and its harmonic frequency is even higher than 65 KHz, resulting in higher inductive reactance. Therefore, the above is only an estimation.

Figure 6:
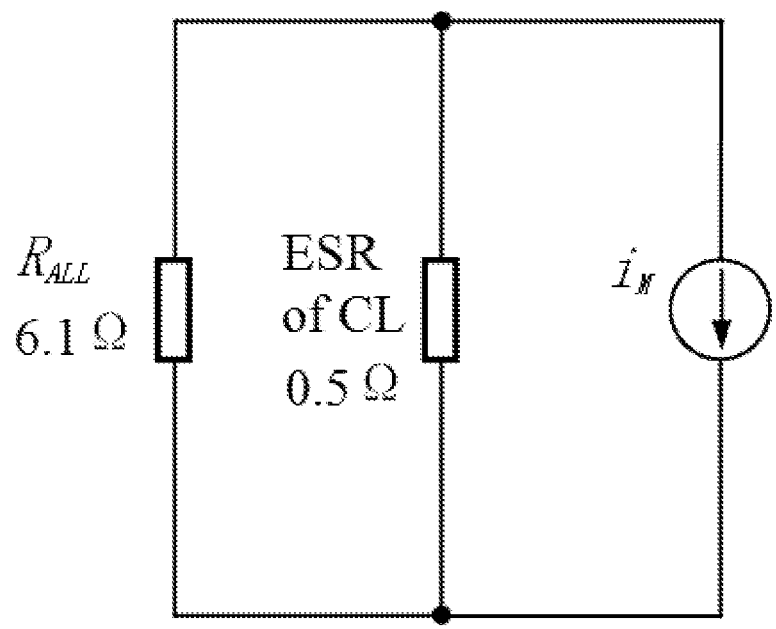
FIG. 6 is an equivalent circuit diagram related to the excitation current of the main power stage in FIG. 5.

An equivalent circuit is as shown in FIG. 6. The excitation current $i_M$ of the main power stage is supplied from two places, one from discharging current $i_{CL}$ of the electrolytic capacitor CL to the main power stage and the other one supplied by the direct current input $U_{DC}$ through the inductor L and recorded as $i_R$. It can be calculated according to FIG. 5 that $i_{CL}$=12.2 $i_R$, and 13.2 $i_R$=$i_M$, namely $i_R$=0.076 $i_M$.

The working frequency of a 25 W fly-back power supply is 65 KHz. Under an input of 300 VDC, the maximum full-load duty ratio is 0.24. If the average value of the excitation current $i_M$ of the main power stage is about 408 mA during conducting of the switching transistor V, and the peak value is about 816 mA, the inductor L also has an excitation current, the peak value of which is about 0.075× 816=61.8 mA and appears at $t_1$ or $t_2$ in FIG. 4, namely before the moment that the switching transistor V is changed from the conducting state into the switched off state. As the current in the inductor may not be changed abruptly, the current of 61.8 mA in the inductor L would continuously flow forwards. If the ESR of the electrolytic capacitor CL is zero in an ideal case, the electrolytic capacitor CL may absorb this current. As the electrolytic capacitor absorbs the current, its terminal voltage would rise, and the varying voltage may be calculated by a formula:

From energy storage formulas of an inductor and a capacitor, and the current may be completely transferred from the inductor to the capacitor, so that it can be seen that: $0.5LI^2$=$0.5CV^2$ $$0.5Li_R^2 = 0.5C(V_1^2 - V_2^2),$$

a calculation result is that: the voltage varies by about 0.69 uV. It can be understood that the voltage of the second terminal 2 is 0.69 uV higher than that of the first terminal 1. At this time, the ESR of the electrolytic capacitor CL plays a leading role for this current, namely a voltage drop generated on the ESR by the current of 61.8 mA is $$U = IR = 61.8 \text{ mA} \times 0.5\Omega = 0.0309V.$$

It can be understood that the voltage of the second terminal 2 is 0.0309 V higher than that of the first terminal 1, which is determined by the external freewheeling characteristic of the inductor. This voltage is not high enough to cause forward conduction of the light emitting diode LED, so that the LED still does not emit light.

It can be seen from FIG. 3, FIG. 4 and FIG. 5 that if a circuit board is designed correctly, only a very small part of the discharging current of the electrolytic capacitor CL to the main power stage flows through the inductor L. During analysis of the working principle, the working principle is similar to teachings of an existing textbook. In such case, it can be understood that the discharging current of the electrolytic capacitor CL to the main power stage does not flow through the inductor L, thereby facilitating the understanding of the working principle.

Figure 7:
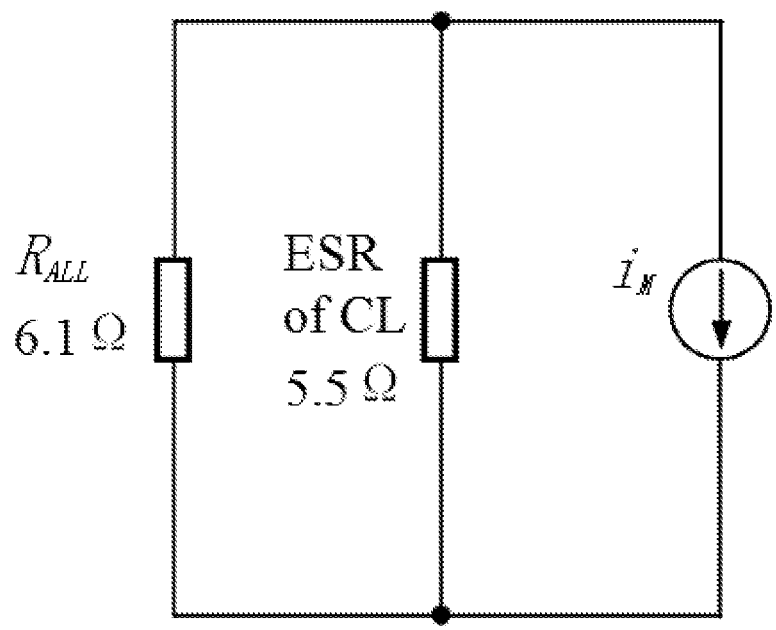
FIG. 7 is an equivalent circuit diagram related to the excitation current of the main power stage after the ESR (Equivalent Series Resistance) of the electrolytic capacitor is increased in the first embodiment.

When the ESR of the electrolytic capacitor CL has risen to 5.5Ω from the qualified 0.5Ω, namely the electrolytic capacitor CL is on the edge of failure, and its equivalent circuit is as shown in FIG. 7. At this time, the excitation current $i_M$ of the main power stage is supplied from two places, one from discharging current $i_{CL}$ of the electrolytic capacitor CL to the main power stage and the other one supplied by the direct current input $U_{DC}$ through the inductor L and also recorded as $i_R$. It can be calculated according to FIG. 7 that $i_{CL}$=1.11 $i_R$, and $i_R$=0.474 $i_M$.

At the moment, the inductor L also has an excitation current, the peak value of which is 0.474×816=387 mA, and appears at $t_1$ or $t_2$ in FIG. 4, namely before the moment that the switching transistor V is changed from the conducting state into the switched off state. As current in an inductor may not be changed abruptly, this current of 387 mA in the inductor L would continuously flow forwards. If the ESR of the electrolytic capacitor CL has risen to 5.5Ω, a voltage drop generated on the ESR by the current of 387 mA is $$U = IR = 387 \text{ mA} \times 5.5 \Omega = 2.13 \text{ V}.$$

Figure 8:
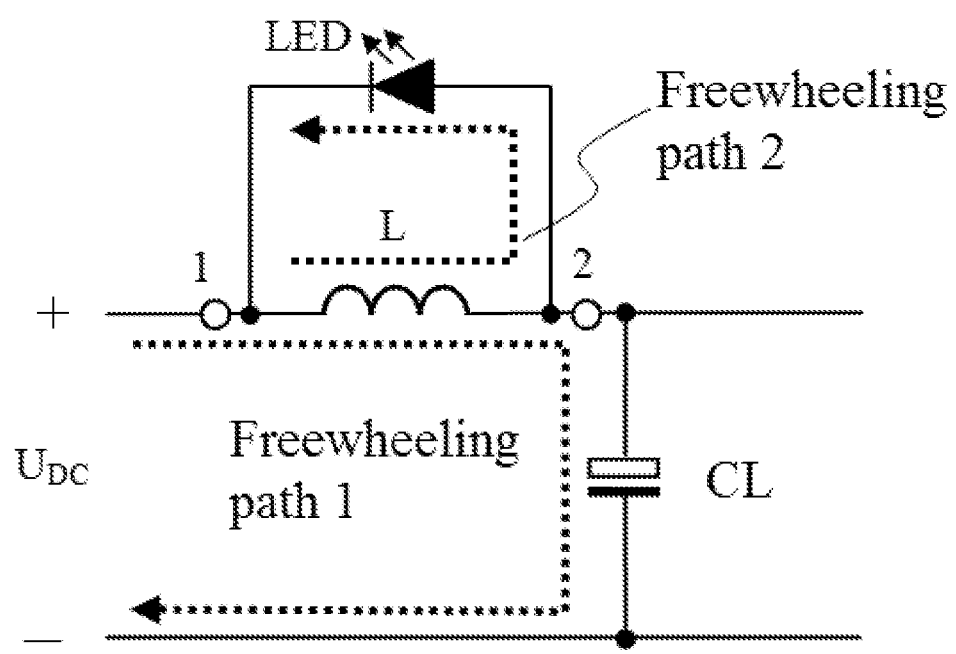
FIG. 8 is a schematic diagram of a path of freewheeling current of an inductor L to the outside at the moment that a switching transistor V is switched off after the ESR of the electrolytic capacitor is increased in the first embodiment.

It can be understood that the voltage of the second terminal 2 of the indicating circuit is 2.13 V higher than that of the first terminal 1, which is determined by the external freewheeling characteristic of the inductor. This voltage is high enough to cause forward conduction of the light emitting diode LED, so that the LED emits light. As shown in FIG. 8, one part of the freewheeling current of the inductor L flows through the LED, as shown in a freewheeling path 2 in the figure, and the other part of the freewheeling current still charges the electrolytic capacitor CL, as shown in a freewheeling path 1 in the figure.

The working principle of the present application is not complicated. If someone reads the above-mentioned analysis of the working principle carefully, it is easy to understand that the current flowing through the inductor may not be changed abruptly, so that when the ESR of the electrolytic capacitor rises, the excitation current obtained in the inductor L is multiplied, from 61.8 mA to 387 mA in the above example, which is six times the original current; at this time, the varying voltage generated on the ESR by the excitation current in the inductor L is higher than a forward light emitting voltage of the LED, so that the freewheeling path 2 is generated to drive the LED to emit light to notify a user that: the ESR of the electrolytic capacitor CL has risen to a concerning point, which means that the direct filtering type switching power supply is going to fail, and the user can decide the next measure. The average value of the current flowing through the LED is 9.4 mA according to actual measurement.

It should be noted that:

If the direct current input $U_{DC}$ is converted into the bridge-rectified pulsating direct current, when the input alternating current is close to the peak value, two diodes in the rectifying bridge 101 are conducted. As the conducting time of the rectifying bridge is less than the alternating current half cycle of 10 mS, for example, in this embodiment, the conducting time of the rectifying bridge is only 0.93 mS when connected to a 220 VAC, and so, the average value of the current flowing through the LED is 0.87 mA according to actual measurement, and the LED with high brightness is still striking.

At this time, the electrolytic capacitor may still work, but the excitation current of the main power stage generates relatively high heat on the ESR, which is 0.22 W in this embodiment. The electrolytic capacitor is in accelerated aging under the high heat, so that in general cases, the ESR rises quickly within dozens of hours to hundreds of hours, thereby resulting in higher heat till the electrolytic capacitor fails and loses its capacitance, which may cause a series of failures such as exploding out of the switching transistor.

However, for a circuit using the present application, when the ESR of the electrolytic capacitor rises to a certain preset value, the direct filtering type switching power supply of the present application provides a striking indicating lamp, or the LED is replaced by the light emitter in the photocoupler, so that the photocoupler outputs an isolated high or low level to notify the user that: the electrolytic capacitor in the switching power supply is going to fail, thereby realizing effective preinforming, or a circuit in a mother system takes an automatic replacement measure.

It can be seen that the first embodiment may achieve the invention objective.

Figure 9:
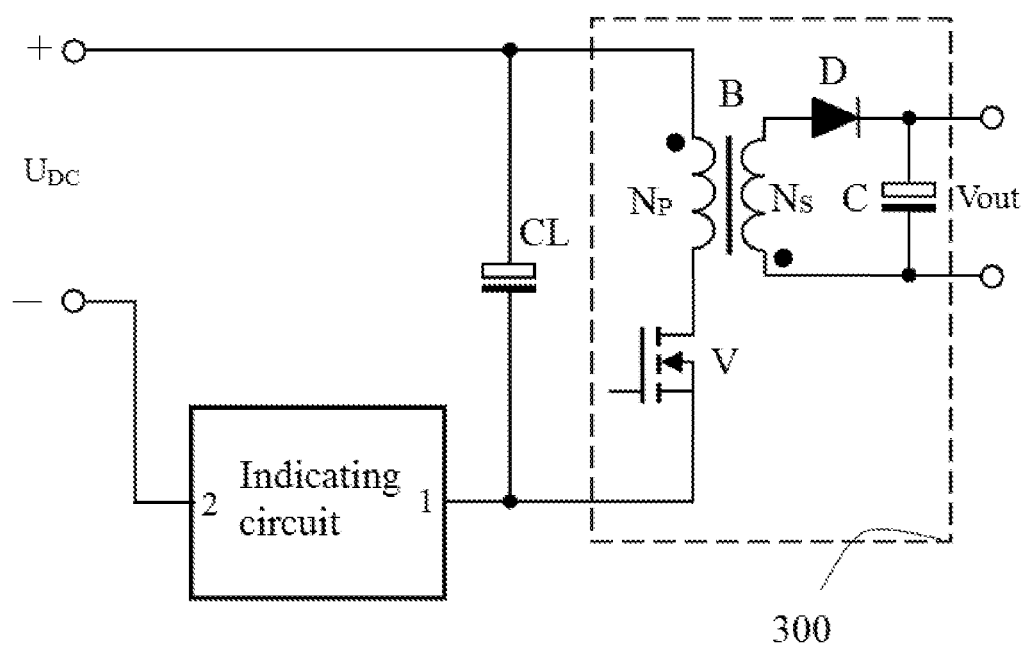
FIG. 9 is another implementation mode of the schematic diagram of the direct filtering type switching power supply of the first embodiment, namely the positions of the direct current input $U_{DC}$ and the indicating circuit are switched.
Figure 10:
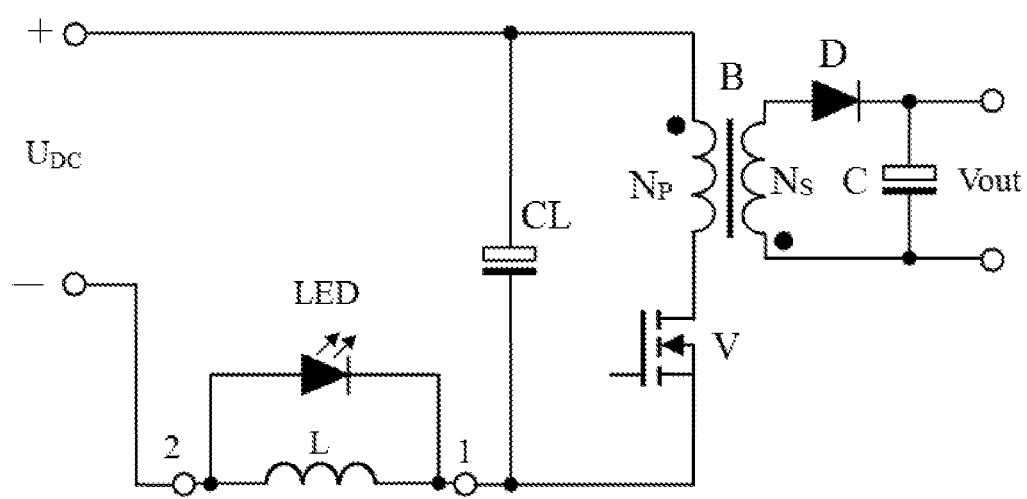
FIG. 10 is a specific circuit diagram of the indicating circuit, in which an LED (Light Emitting Diode) is connected in parallel with the inductor, in FIG. 9.

There are two implementation modes for connecting the direct current input $U_{DC}$ to the filter circuit through the indicating circuit: one as shown in FIG. 2 and the other one as shown in FIG. 9, namely the positions of the direct current input $U_{DC}$ and the indicating circuit are switched. For a serially connected circuit, during switching of the positions, when attention is paid to the polarity of the device having the unidirectional conductivity, the circuit is equivalent. FIG. 10 shows a specific connection relation which accords with the following condition that: the indicating circuit consists of the light emitting unit and the first inductor which are connected in parallel with each other, and makes sure that the current direction of the direct current input $U_{DC}$ passing through the first inductor L is opposite to the conducting direction of the light emitting unit. The light emitting unit has two terminals, and has the unidirectional conductivity. The light emitting unit in FIG. 10 is relatively simple, which is only the LED. In FIG. 2, FIG. 9 and FIG. 10, the power stage may also be replaced by a half-bridge conversion circuit, or a single-transistor forward circuit, or a full-bridge circuit because all the circuits may achieve the invention objective according to actual measurement.

Second Embodiment

Figure 11:
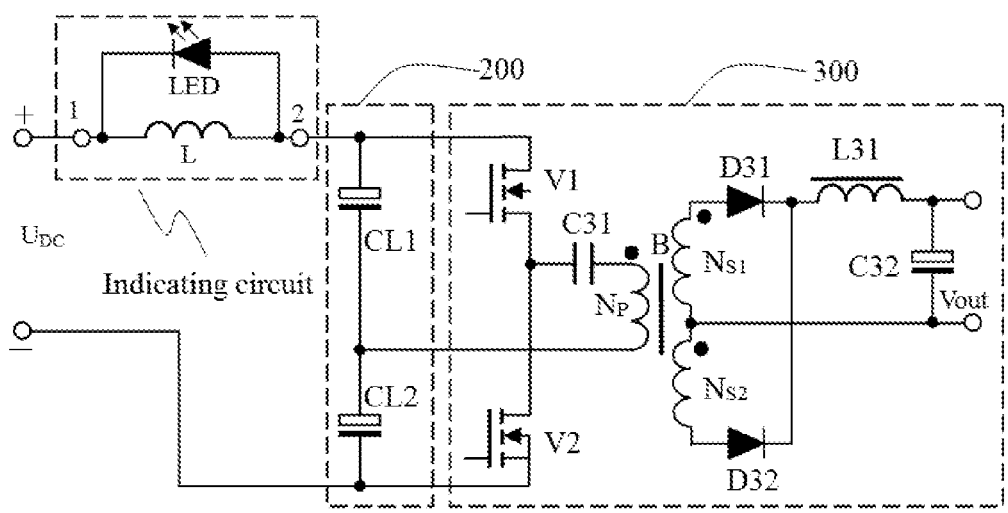
FIG. 11 is a schematic diagram of a direct filtering type switching power supply of a second embodiment.

The second embodiment is as shown in FIG. 11, which shows a schematic diagram of a direct filtering type switching power supply of the second embodiment of the present application. A direct filtering type switching power supply, for direct current input $U_{DC}$ that includes pulsating direct current, including a filter circuit 200, a main power stage 300, and an indicating circuit having two terminals 1 and 2. The direct current input $U_{DC}$ is connected to the filter circuit 200 through the indicating circuit, and the filter circuit 200 is connected in parallel with the main power stage 300. The direct filtering type switching power supply is characterized in that the indicating circuit is formed by connecting a light emitting unit with a first inductor L in parallel, and makes sure that the current direction of the direct current input $U_{DC}$ passing through the first inductor L is opposite to the conducting direction of the light emitting unit. The light emitting unit has two terminals, and has unidirectional conductivity. The light emitting unit here is only a light emitting diode LED which has the unidirectional conductivity. The cathode of the light emitting diode LED is connected to the current in-flow terminal of the first inductor L, namely to the terminal 1 of the indicating circuit in the figure, and the anode of the light emitting diode LED is connected to the current flow-out terminal of the first inductor L, namely to the terminal 2 of the indicating circuit in the figure, thereby satisfying the condition that: the cunent direction of the direct current input $U_{DC}$ passing through the first inductor L is opposite to the conducting direction of the light emitting unit.

The filter circuit 200 is connected in parallel with the main power stage 300. During parallel connection, reverse connection is not allowed. It is a basic skill for a person skilled in the art to make sure that the main power stage is not connected reversely.

To adapt to a connection mode of a half-bridge circuit, the filter circuit 200 is formed by connecting two electrolytic capacitors CL1 and CL2 which have the same capacitance and relatively low withstand voltage in series, and a connection point is connected to the half-bridge circuit. No voltage sharing resistor connected in parallel to the electrolytic capacitors is drawn in the figure. The main power stage 300 is a half-bridge converter circuit, C31 is a coupling capacitor for improving the magnetic biasing performance, and the other side of a transformer B is a universal output rectifying circuit.

When a power transistor V1 is conducted, in a normal case, energy of the electrolytic capacitor CL1 returns to the cathode of the electrolytic capacitor CL1 through the anode of CL1, the power transistor V1, the capacitor C31 and the primary side Np of the transformer B; and if the ESR of the electrolytic capacitor CL1 rises to a relatively large value, the direct current input $U_{DC}$ and the electrolytic capacitor CL2 are still equivalent to one "power supply" after being connected in series, and this equivalent power supply is still connected in series with the inductor L to participate in excitation; before the moment that the power transistor V1 is switched off, the excitation current of the inductor L may not disappear, but is still freewheeled just like the working principle of the above-mentioned first embodiment. As the ESR of the electrolytic capacitor CL1 rises to the relatively large value, part of the freewheeling current lights the LED to achieve the invention objective.

When the power transistor V1 is conducted, a power transistor V2 is switched off at the moment. In normal cases, the energy of the electrolytic capacitor CL1 returns to the cathode of the electrolytic capacitor CL1 through the anode of CL1, the power transistor V1, the capacitor C31 and the primary side Np of the transformer B. In this process, the electrolytic capacitor CL1 may charge C31, resulting in rise of the terminal voltage of C31; and, when power transistor V2 is conducted, the power transistor V1 is switched off. In normal cases, the energy of the electrolytic capacitor CL2 returns to the cathode of the electrolytic capacitor CL2 through the anode of CL2, the primary side Np of the transformer B, the capacitor C31 and the power transistor V2. In this process, the electrolytic capacitor CL2 may discharge C31, resulting in reduction of the terminal voltage of C31. If the ESR of the electrolytic capacitor CL2 rises to a relatively large value, the direct current input $U_{DC}$ and the electrolytic capacitor CL1 are still equivalent to one "power supply" after being connected in series, and this equivalent power supply is still connected in series with the inductor L to participate in excitation; before the moment that the power transistor V2 is switched off, the excitation current of the inductor L may not disappear, but is still freewheeled just like the working principle of the above-mentioned first embodiment. As the ESR of the electrolytic capacitor CL2 rises to the relatively large value, part of the freewheeling current lights the LED to achieve the invention objective.

If the ESRs of the electrolytic capacitors CL1 and CL2 rise at the same time, the second embodiment, by simple analysis, still may achieve the invention objective to light the LED.

The filter circuit 200 may be formed by serial connection and series-parallel connection of multiple electrolytic capacitors. The filter circuit is formed by a single capacitor in FIG. 2 and FIG. 9, and formed by two connected capacitors in FIG. 11.

With reference to FIG. 2, FIG. 9 and FIG. 11, at the electrification moment, it is most possible that direct current input $U_{DC}$ is in a high-voltage state instead of a zero volt state. As the terminal voltage of the electrolytic capacitor CL is zero, and may not be changed abruptly, the current in the inductor L is zero, and may not be changed abruptly. At the electrification moment, most of instantaneous direct current input $U_{DC}$ may be applied to two ends of the LED to reversely break down the LED. The withstand voltage nominal value of the LED is generally only about 5 to 10 V, and is about 35 V according to actual measurement, and a few of manufacturers can make the value at about 170 V, but the LED still may not withstand the peak value of the direct current input $U_{DC}$. An embodiment below is to solve this problem by improving the indicating circuit. For the purpose of convenience, the embodiment is postponed as a third embodiment. It should be noted that all embodiments below must be arranged into the circuits as shown in FIG. 2, FIG. 9 and FIG. 11 to form complete embodiments. For the only purposes of convenience and saving of spaces, descriptions are made below only to embodiments of indicating circuits.

Third Embodiment

Figure 12:
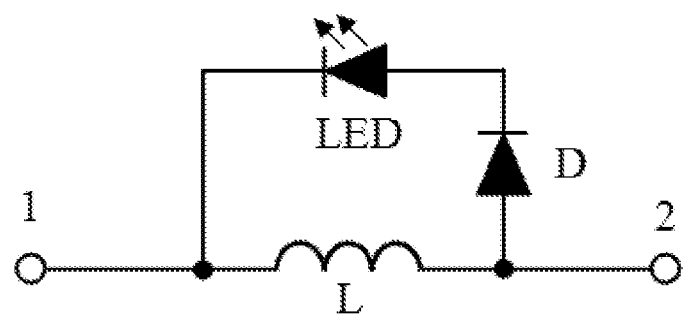
FIG. 12 is a schematic diagram of an indicating circuit in a third embodiment of the present application.

With reference to FIG. 12, it is a schematic diagram of an indicating circuit in the third embodiment of the present application. A light emitting unit is formed by connecting a light emitting diode LED and a diode D in series in the same direction. A connection relation of the indicating circuit is as follows: the first diode D and the first light emitting diode LED are connected in series in the same direction to form a two-terminal network which is connected in parallel with an inductor L; a connection point of the cathode of the two-terminal network and the first inductor forms a first terminal 1; and a connection point of the anode of the two-terminal network and the first inductor forms a second terminal 2.

The two-terminal network is: a circuit structure which is formed by interconnecting one or two or more elements and has two terminals.

The anode and the cathode of the two-terminal network are as follows: for the two-terminal network having unidirectional conductivity, when the voltage of the anode is higher than that of the cathode, current may be generated; and when the voltage of the cathode is higher than that of the anode, no current may be generated. A first network, a second network and a fourth network in this application all have the unidirectional conductivity.

Serial connection in the same direction is as follows: two or more two-terminal networks are connected in series, wherein at least two two-terminal networks have the unidirectional conductivity, and may still have the unidirectional conductivity after being connected in series. Positions of all the two-terminal networks in the application may be subjected to permutated combinations which are not enumerated in the embodiments and drawings. The various permutated combinations shall all fall within the scope of protection of the application.

Figure 13:
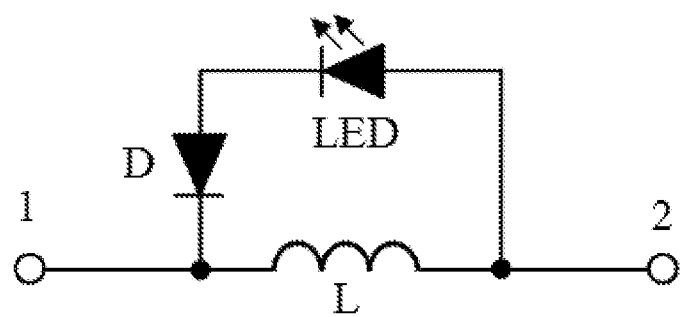
FIG. 13 is another implementation mode of the schematic diagram of the indicating circuit in the third embodiment, namely the positions of an LED and a diode are switched.

Serial connection in the same direction in this embodiment is as follows: the diodes have the unidirectional conduction characteristics, meaning that the cathode of one diode is connected with the anode of the other diode, so that the serially connected two-terminal networks still have the unidirectional conductivity except that the conducting voltage drop is equal to a sum of the original conducting voltage drops of the two diodes. By such serial connection, even if the positions of the two diodes are switched, they still have the unidirectional conductivity, and the withstand voltage is the sum of the withstand voltages of the two diodes. FIG. 13 shows another mode of equivalent serial connection.

A diode having the withstand voltage greater than the maximum high-voltage value of a direct current power supply U is selected as the first diode D. In consideration that forward conduction works under the high frequency of the switching power supply, a fast recovery rectifying diode may be adopted, such as 1N4007 having the withstand voltage of 1,000 V, or SF106 having the withstand voltage of 400 V. After the diode is connected in series into the circuit, during electrification, two ends of the first diode D withstand high voltage, so that the reversed high voltage for breaking down the LED is shared, and the first diode D achieves a protective effect.

In case of higher powered switching power supply, or relatively low working voltage of the direct current input $U_{DC}$, the main power stage 300 generates relatively high ripple current. At this time, the freewheeling current for turning on the light emitting unit is possibly too high, and common LEDs and light emitters in photocouplers are easy to damage because their maximum bearable current is generally about 50 mA. Therefore, a fourth embodiment is to solve this problem.

Fourth Embodiment

Figure 14:
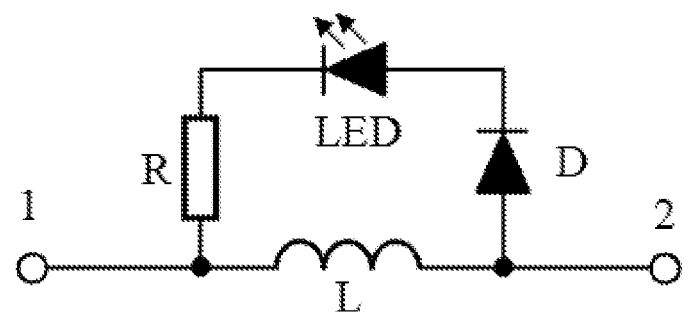
FIG. 14 is a schematic diagram of an indicating circuit in a fourth embodiment of the present application.

With reference to FIG. 14, on the basis of the third embodiment, the indicating circuit further includes a first resistor R, and the light emitting unit is formed by connecting a light emitting diode LED, a diode D and the resistor R in series in the same direction; wherein a connection relation is as follows: the first diode D, the first light emitting diode LED and the first resistor R are connected in series in the same direction to form a new network which is connected in parallel with the first inductor L. Even if the three devices are connected in series, the unidirectional conduction condition must still be realized. There are six serial connection modes according to a permutated combination method, and they will not be described one by one here. A connection point of the cathode of new network and the inductor L forms a first terminal 1, and a connection point of the anode of the new network and the inductor forms a second terminal 2.

The fourth embodiment is arranged into FIG. 2, FIG. 9 and FIG. 11 to also achieve the invention objective. Due to a current limiting resistor R, in case of higher powered 300, or relatively low working voltage of the direct current input $U_{DC}$, the excitation current of the main power stage 300 is relatively high. At this time, if no current limiting resistor R exists, common LEDs and light emitters in photocouplers are easy to damage because their maximum bearable current is generally about 50 mA, and the current limiting resistor R in the fourth embodiment is to solve this problem.

As the main power stage 300 generates high-frequency ripple current, it determines that the current for lighting the LED is high-frequency current instead of direct current, and may easily damage a light emitting diode or a light emitter in the photocoupler which only works at a low frequency, so that a solution of the indicating circuit is provided in a fifth embodiment.

Fifth Embodiment

Figure 15:
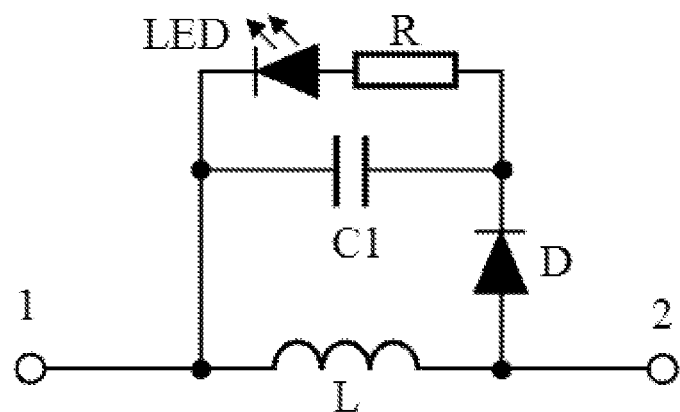
FIG. 15 is a schematic diagram of an indicating circuit in a fifth embodiment of the present application.

With reference to FIG. 15, the indicating circuit includes a light emitting diode LED, a diode D, a first resistor R, a first inductor L and a first capacitor C1. A connection relation of the indicating circuit is as follows: the light emitting diode LED and the resistor R are connected in series and then are connected in parallel with the first capacitor C1 to form a third network which then is connected in series with the diode D in the same direction to form a light emitting unit. The light emitting unit is connected in parallel with the first inductor L; and a connection point of the cathode of the light emitting unit and the inductor L foil is a first terminal 1, and a connection point of the anode of the light emitting unit and the inductor L forms a second terminal 2.

It can be seen from the above that the third network is as follows: the LED and the resistor R are connected in series, and then are connected in parallel with the capacitor C. As the capacitor may isolate direct current and connect alternating current, the third network still has the unidirectional conduction characteristic under the direct current. The end where the direct current flows out is the cathode, and the end where the direct current flows in is the anode. Therefore, it can be better understood that the third network still has the unidirectional conductivity after being connected in series with the diode D in the same direction. When the light emitting unit is connected in parallel with the inductor L, the current direction of power supplied from the direct current power supply to the outside through the first inductor should be opposite to the conducting direction of the light emitting unit.

Figure 16:
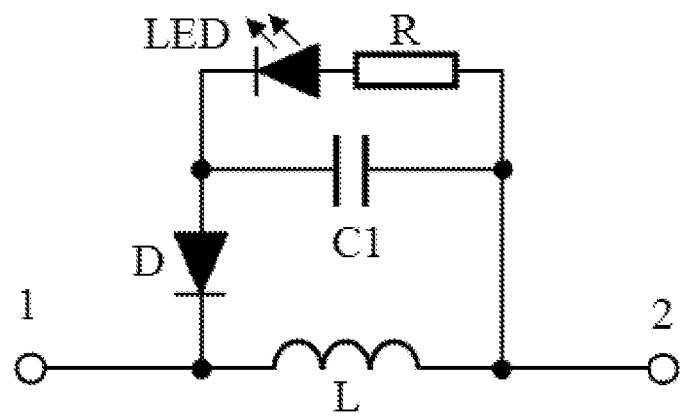
FIG. 16 is another implementation mode of the schematic diagram of the indicating circuit in the fifth embodiment of the present application, namely the positions of a diode D and a third network are switched.

There are a total of four connection methods for the fifth embodiment, and all may achieve the invention objective. FIG. 16 shows another circuit formed by connecting the third network with the diode D in series in the same direction. There are also two methods for connecting the first light emitting diode LED with the first resistor R in series, and the methods will not be shown one by one here.

The indicating circuit of the fifth embodiment is arranged into FIG. 2, FIG. 9 and FIG. 11 to also achieve the invention objective. The freewheeling current is first filtered by the capacitor C1, and then is supplied to the LED through the current limiting resistor R, so that the LED obtains smooth direct current, and may emit light stably without a high-frequency current component. If the wire of the LED is relatively long, the wire may not cause high-frequency cunent radiated to the space, thereby improving the radiation disturbance of the present application and reducing EMI (Electro-Magnetic Interference).

When the LED is replaced by a light emitter in the photocoupler, output current of the photocoupler is also a stable signal which may not make troubles for the subsequent circuit. When the collector electrode of the output end of the photocoupler is connected with a pull-up resistor, and the electrolytic capacitor CL is on the edge of failure, the collector electrode of the output end of the photocoupler may output a low level, and when the emitting electrode of the output end of the photocoupler is connected with a pull-down resistor, and the detected capacitor is on the edge of failure, the emitting electrode of the output end of the photocoupler may output a high level, so as to inform a subsequent intelligent circuit to take actions, such as sounding an alarm, or automatically switching to another switching power supply, or displaying the level on a screen, and a failure time length of the switching power supply may be indicated according to the size of the current output from the output end of the photocoupler, so as to notify a user to make a further preferred selection of an optimal solution.

Or the LED remains, and two ends of the filter capacitor C1 are then connected in parallel with a second network which is formed by connecting a second resistor with an LED2 in the photocoupler in series. Therefore, both light notifying and a low or high level output may be realized. It can be seen that the light emitting units of the third embodiment, the fourth embodiment and the fifth embodiment are arranged into FIG. 2, FIG. 9 and FIG. 11 to also achieve the invention objective.

By virtue of the inductance, a section of lead wire may be used as the first inductor L on a circuit board. By reasonable design and valuing of other elements, the above-mentioned embodiments of the direct filtering type switching power supply of the present application may also work normally. Such a mode should also fall within the scope of protection of claims of the application. Of course, during design of the circuit board, this section of lead wire may be routed on the circuit board according to an inductance mode, thereby increasing the inductance and also achieving the invention objective.

According to the first embodiment to the fifth embodiment, if the LED is replaced by the light emitter of the photocoupler, the indicating circuit may realize an electrical isolation function by the help of the electrical isolation function of the photocoupler. If the LED lamp is directly used, as it is often mounted on a panel, in all the above-mentioned use methods, the LED lamp is alive, and may not be isolated from the direct current input $U_{DC}$. Particularly, after the rectifying bridge is added, when alternating current input is used, there is a risk that the user touches the LED lamp, resulting in potential hazard in the aspect of the safety standard.

Therefore, four embodiments below of the present application realize the electrical isolation function for the LED.

Sixth Embodiment

Figure 17:
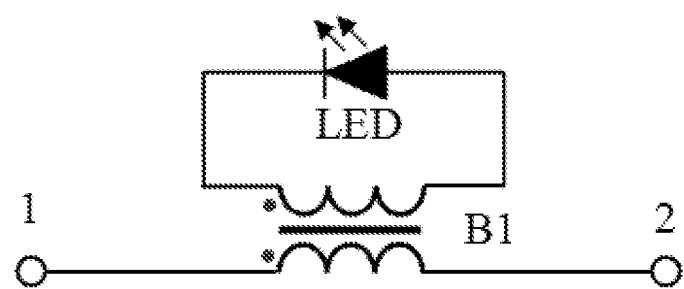
FIG. 17 is a schematic diagram of an indicating circuit in a sixth embodiment of the present application.

With reference to FIG. 17, the indicating circuit realizes a function of isolating an LED lamp from alternating current, and includes a first terminal 1, a second terminal 2, a first transformer B1 and a first light emitting diode LED. The first transformer B1 at least includes a primary winding and a secondary winding. The first light emitting diode LED is connected in parallel with the secondary winding of the first transformer B1, and the terminal, which is connected with the cathode of the first light emitting diode LED, of the secondary winding is used as a dotted terminal. The terminal having a black dot in FIG. 17 is the marker of the dotted terminal. The corresponding dotted terminal of the primary winding is used as the first terminal 1, and the other terminal of the primary winding is used as the second terminal 2. The indicating circuit makes sure that the current of the direct current input flows in through the first terminal 1, then flows through the primary winding, and flows out from the second terminal 2.

In various documents, only the transformer has the primary winding and the secondary winding. The indicating circuits in the technical solutions of the application only include the same transformer having the same functions, so that unless otherwise specified, all the windings are windings of the first transformer B1.

The indicating circuit of the sixth embodiment is arranged into the direct filtering type switching power supplies in FIG. 2, FIG. 9 and FIG. 11. The sixth embodiment is an isolation version of the first embodiment, so that the working principle is slightly different.

The working principle of the sixth embodiment is slightly complicated. The path of charging current generated by the direct current input $U_{DC}$ is similar to that as shown in FIG. 3. The inductor L is the primary winding of the transformer. As the charging current is a low-frequency current, the charging current varies slowly. During use, the transformer B1 is a high-frequency transformer, and even a current transformer, the primary winding of which is relatively low in inductance. The primary winding is called primary side for short below. A voltage drop generated on the primary side of the transformer B1 by the charging current is extremely small, not even a few mV. This voltage induced to the secondary winding through the transformer B is related to a turn ratio. If the turn ratio is 1:10, the induced voltage of the secondary winding is far less than dozens mV because the transformer B is the high-frequency transformer, which is high in leakage inductance in a low-frequency stage, resulting in extremely low initial permeability and extremely low energy transmission efficiency of a magnetic core. Furthermore, if the terminal marked by the dotted terminal is positive, the LED is in reversal of biasing, and does not emit light. As the induced voltage of the secondary winding is too low, the LED may not be broken down.

The excitation current $i_M$ of the main power stage is also as shown in FIG. 5. Only a very small part of the discharging current of the electrolytic capacitor CL to the main power stage flows through the transformer B. The induced voltage of the secondary winding of the transformer B is far less than the forward conduction voltage of the LED, so that the LED does not emit light.

When the ESR of the electrolytic capacitor CL has risen to 5.5Ω from the qualified 0.5Ω, namely the electrolytic capacitor CL is on the edge of failure, and the inductance of the primary side of the transformer B1 is still 4.7 uH. Then, under the same condition, the primary side of the transformer B has an excitation current, with a peak value of 387 mA. The peak value appears at the time point $t_1$ or $t_2$ in FIG. 4, namely before the moment that the switching transistor V is changed from the conducting state into the switched off state. As the current in the inductor may not be changed abruptly, the current of 387 mA in the primary side inductor of the transformer B1 would continuously flow forwards. If the ESR of the electrolytic capacitor CL has risen to 5.5Ω, a voltage drop generated on the ESR by the current of 387 mA is the same as the above mentioned.

With reference to FIG. 17, the voltage of the second terminal 2 is also 2.13 V higher than that of the first terminal 1, so that the induced voltage of the secondary winding of the transformer B1 is also lower on the dotted terminal, namely the voltage of the anode of the LED is higher than that of the cathode. Even if the turn ratio of the transformer B1 is as low as 1:1, the LED emits light because of the forward induced voltage of the secondary winding of the transformer B, thereby forming current for lighting the LED in FIG. 17.

Another way to understand the working principle of the sixth embodiment which adopts the transformer B1 for isolation is as follows: before the moment that the switching transistor V is changed from the conducting state into the switched off state, as the current in the inductor may not be changed abruptly, the current which has reached the peak value in the primary side inductor of the transformer B1 would continuously flow forwards, and the ESR of the electrolytic capacitor CL has risen, and may not well absorb the excitation current of the primary side inductor of the transformer B. This current flows from the dotted terminal to the non-dotted terminal. At this time, the transformer B1 is operated as an energy storage inductor, and the part, which may not be absorbed, in the current may flow from the dotted terminal to the non-dotted terminal inside the secondary winding, thereby forming current for lighting the LED in FIG. 17. This is similar to the working principle of a fly-back power supply that it is the current driving the LED to emit light.

The sixth embodiment, namely the indicating circuit in FIG. 17, is arranged into the direct filtering type switching power supplies in FIG. 2, FIG. 9 and FIG. 11, and the direct filtering type switching power supplies can still work normally.

The sixth embodiment realizes isolation from the alternating current, and also achieves the invention objective. At the electrification moment, it is most possible that the direct current input $U_{DC}$ is in a high-voltage state instead of a zero volt state. As the terminal voltage of the electrolytic capacitor CL is zero, and may not be changed abruptly, the current in the primary side inductor of the transformer B1 is zero, and may not be changed abruptly. At the electrification moment, most of instantaneous direct current input $U_{DC}$ may be applied to two ends of the primary side of the transformer B, and the induced voltage of the secondary side reversely breaks down the LED. Therefore, a seventh embodiment is to solve this problem.

Seventh Embodiment

Figure 18:
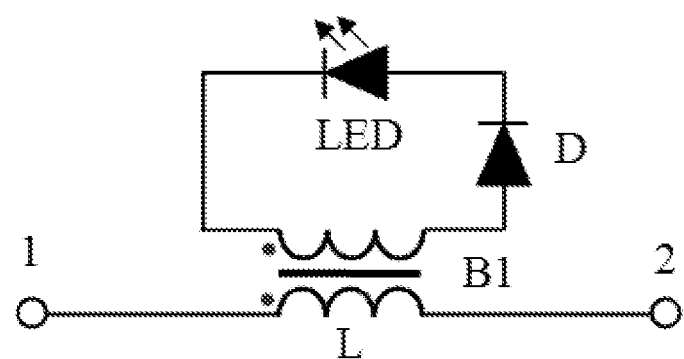
FIG. 18 is a schematic diagram of an indicating circuit in a seventh embodiment of the present application.

With reference to FIG. 18, on the basis of the sixth embodiment, a first diode D is further included. A connection relation is as follows: the first diode D is connected in series with the first light emitting diode LED in the same direction to form a first network which is connected in parallel with the secondary winding of the first transformer B1. Furthermore, the terminal, which is connected with the cathode of the first network, of the secondary winding is used as a dotted terminal. The corresponding dotted terminal of the primary winding is used as a first terminal 1, and the other terminal of the primary winding is used as a second terminal 2.

Figure 19:
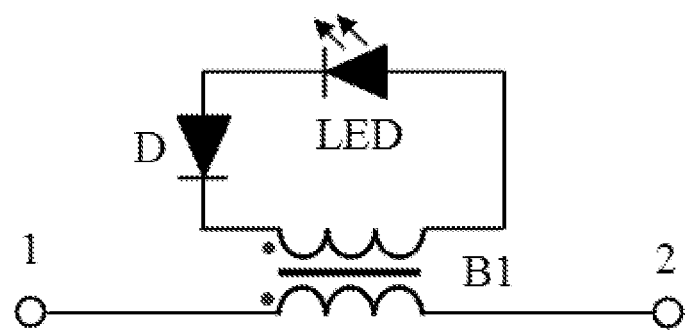
FIG. 19 is another implementation mode of the schematic diagram of the indicating circuit in the seventh embodiment of the present application, namely the positions of an LED and a diode are switched.

FIG. 19 shows another mode of serial connection in the same direction.

The seventh embodiment is an isolation version of the third embodiment. The working principle for preventing reverse breakdown is introduced in the third embodiment, so that no more details will be described here. The indicating circuit of the seventh embodiment is arranged into the direct filtering type switching power supplies in FIG. 2, FIG. 9 and FIG. 11 to also achieve the invention objective. The seventh embodiment, namely the indicating circuit as shown in FIG. 18 or FIG. 19, also may easily damage an LED or a light emitter in a photocoupler due to absence of current limiting resistor. Therefore, an eighth embodiment is to solve this problem.

Eighth Embodiment

Figure 20:
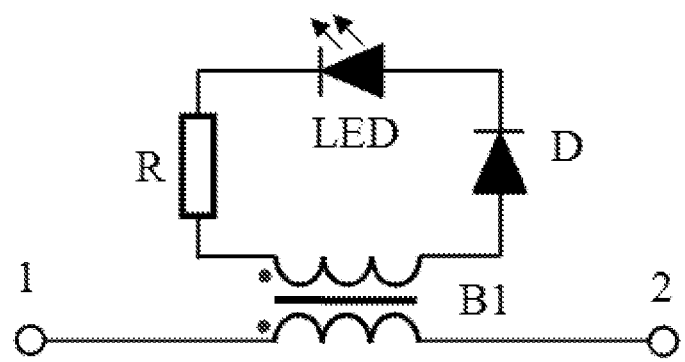
FIG. 20 is a schematic diagram of an indicating circuit in an eighth embodiment of the present application.

With reference to FIG. 20, on the basis of the seventh embodiment, a first resistor R is further included. A connection relation is as follows: the first diode D, the first light emitting diode LED and the first resistor R are connected in series in the same direction to form a second network which is connected in parallel with the secondary winding of the first transformer B1. Furthermore, the terminal, which is connected with the cathode of the second network, of the secondary winding is used as a dotted The corresponding dotted terminal of the primary winding is used as a first terminal 2, and the other terminal of the primary winding is used as a second terminal 2.

The eighth embodiment is an isolation version of the fourth embodiment. Even if the three devices are connected in series in the same direction, the unidirectional conduction characteristic must still be realized. There are six serial connection modes according to a permuted combination method, and the modes will not be shown one by one here. Arranging into the direct filtering type switching power supplies in FIG. 2, FIG. 9 and FIG. 11 according to the requirements in the technical solution, the direct filtering type switching power supplies can still work normally.

Similar to the reason described in last part of the fourth embodiment above, a ninth embodiment provides a solution.

Ninth Embodiment

Figure 21:
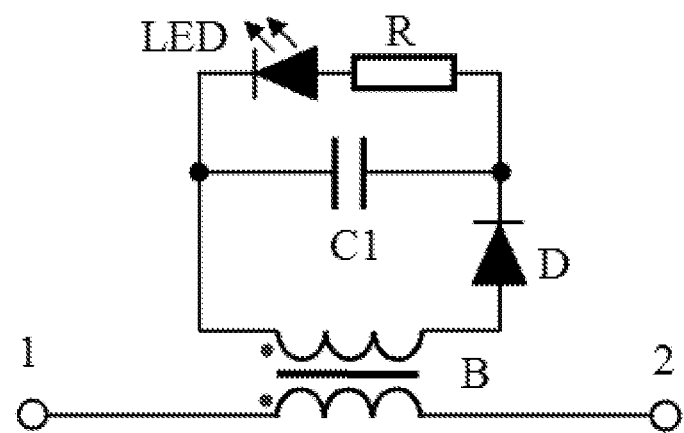
FIG. 21 is a schematic diagram of an indicating circuit in a ninth embodiment of the present application.

With reference to FIG. 21, on the basis of the eighth embodiment, a first capacitor C1 is further included. A connection relation is as follows:

the first light emitting diode LED and the first resistor R are connected in series, and then are connected in parallel with the first capacitor C1 to form a third network which is connected in series with the first diode D in the same direction to form a fourth network; and the fourth network is connected in parallel with the secondary winding of the first transformer B1. Furthermore, the terminal, which is connected with the cathode of the fourth network, of the secondary winding is used as a dotted terminal. The corresponding dotted terminal of the primary winding is used as a first terminal 1, and the other terminal of the primary winding is used as a second terminal 2.

Figure 22:
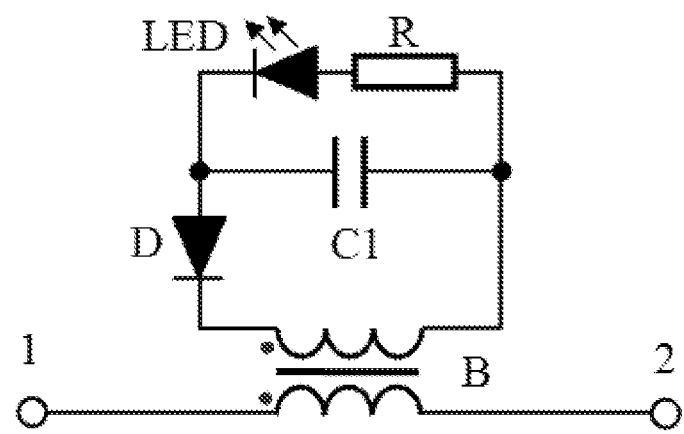
FIG. 22 is another implementation mode of the schematic diagram of the indicating circuit in the ninth embodiment, namely the positions of a diode D and a third network are switched.

The ninth embodiment is an isolation version of the fifth embodiment. The working principle of the filter is the same as that of the fifth embodiment. The ninth embodiment has four connection methods which may all achieve the invention objective. FIG. 22 shows another circuit in which the third network is connected in series with the diode D in the same direction. There are also two methods for serial connection between the first light emitting diode LED and the first resistor R, and the methods will not be shown one by one here.

Arranging the ninth embodiment into the direct filtering type switching power supplies in FIG. 2, FIG. 9 and FIG. 11 to also achieve the invention objective.

According to the sixth embodiment to the ninth embodiment, the LED lamp is directly used, and is mounted on the panel. The LED lamp is not electrically connected, and is isolated from input strong current, thereby meeting the requirements of the safety standard.

The transformer B1 may be a current transformer. According to actual measurement, even if the primary side includes one turn, the transformer B1 may also work, so as to reduce the cost of the current transformer. A solution with relatively low cost is that holes are formed at two sides of one lead wire on a circuit board, and are clamped with an EI or CC type magnetic core including a coiled secondary winding, so as to directly realize the function of the transformer B1.

For the direct filtering type switching power supply provided with the rectifying bridge, in the embodiments 1 to 9, if one high-frequency capacitor is connected in parallel between two ends of the direct current power supply, when the rectifying bridge is not conducted, the inductor L or the main power transformer of the switching power supply may participate in excitation after the ESR of the electrolytic capacitor CL is increased, so that the circuit performance of the present application is improved. Similarly, when the direct current power supply is a solar battery, as the output characteristic of the solar battery is an approximate constant current mode, with relatively high internal resistance, the solar battery still needs to be connected in parallel with a high-frequency capacitor.

Therefore, the present application may definitely solve the problems in the prior art, achieving expected beneficial effects with small-sized elements and low cost.

The above descriptions are only preferred implementation modes of the present application. It should be noted that the above-mentioned preferred implementation modes shall not be deemed as limiting the present application. Ordinary persons skilled in the art can further make a plurality of improvements and embellishments, such as connecting a resistor in series into the first diode, without departing from the spirit and scope of the present application. These improvements and embellishments shall fall within the scope of protection of the present application, and no more embodiments will be described here. The scope of protection of the present application shall be based on the scope defined by claims.

What is claimed is:

1. A direct filtering type switching power supply, for direct current input including pulsating direct current, the direct filtering type switching power supply comprising: a filter circuit, a main power stage, and an indicating circuit having two terminals;

the direct current input is connected to the filter circuit through the indicating circuit, and the filter circuit is connected in parallel with the main power stage, the main power stage includes a power transformer connected in parallel with the filter circuit, the indicating circuit is formed by connecting a light emitting unit having unidirectional conductivity with a first inductor in parallel, and a current direction of the direct current input passing through the first inductor is opposite to a conducting direction of the light emitting unit.

2. The direct filtering type switching power supply according to claim 1, further comprising a rectifying bridge, the filter circuit at least includes an electrolytic capacitor.

3. The direct filtering type switching power supply according to claim 1, further comprising a rectifying bridge, wherein the first inductor is a filter inductor for increasing a power factor.

4. The direct filtering type switching power supply according to claim 1, wherein the light emitting unit is a light emitting diode.

5. The direct filtering type switching power supply according to claim 1, wherein the light emitting unit is formed by connecting a light emitting diode with a diode in series in the same direction.

6. The direct filtering type switching power supply according to claim 1, wherein the light emitting unit is fonned by connecting a light emitting diode, a diode and a first resistor in series in the same direction.

7. The direct filtering type switching power supply according to claim 1, wherein the light emitting unit comprises a light emitting diode, a diode, a first resistor and a first capacitor; and a connection relation is as follows: the light emitting diode and the resistor are connected in series, and then are connected in parallel with the first capacitor to form a third network which is then connected in series with the diode in the same direction.

8. A direct filtering type switching power supply, for direct current input including pulsating direct current, the direct filtering type switching power supply comprising: a filter circuit, a main power stage, an indicating circuit having two terminals; wherein:

the direct current input is connected to the filter circuit through the indicating circuit, the filter circuit is connected in parallel with the main power stage, the main power stage includes a power transformer connected in parallel with the filter circuit, and the indicating circuit comprises a first terminal, a second terminal, a first transformer and a first light emitting diode; the first transformer at least comprises a primary winding and a secondary winding; the first light emitting diode is connected in parallel with the secondary winding of the first transformer; a terminal, which is connected with the cathode of the first light emitting diode, of the secondary winding is used as a dotted terminal; a corresponding dotted terminal of the primary winding is used as the first terminal; the other terminal of the primary winding is used as the second terminal; and the current input by the direct current flows in through the first terminal, then flows through the primary winding, and flows out from the second terminal.

9. The direct filtering type switching power supply according to claim 8, further comprising a first diode, wherein a correction relation is as follows: the first diode is connected in series with the first light emitting diode in the same direction to form a first network; the first network is connected in parallel with the secondary winding of the first transformer, and a terminal, which is connected with the cathode of the first network, of the secondary winding is used as a dotted terminal; and a corresponding dotted terminal of the primary winding is used as the first terminal, and the other terminal of the primary winding is used as the second terminal.

10. The direct filtering type switching power supply according to claim 9, further comprising a first resistor, wherein a connection relation is as follows: the first diode, the first light emitting diode and the first resistor are connected in series in the same direction to form a second network; the second network is connected in parallel with the secondary winding of the first transformer, and a terminal, which is connected with the cathode of the second network, of the secondary winding is used as a dotted terminal; and a corresponding dotted terminal of the primary winding is used as the first terminal, and the other terminal of the primary winding is used as the second terminal.

11. The direct filtering type switching power supply according to claim 10, further comprising a first capacitor, wherein a connection relation is as follows: the first light emitting diode and the first resistor are connected in series, and then are connected in parallel with the first capacitor to form a third network which is then connected in series with the first diode in the same direction to form a fourth network; the fourth network is connected in parallel with the secondary winding of the first transformer, and a terminal, which is connected with the cathode of the fourth network, of the secondary winding is used as a dotted terminal; and a corresponding dotted terminal of the primary winding is used as the first terminal, and the other terminal of the primary winding is used as the second terminal.

12. The direct filtering type switching power supply according to claim 4, further comprising a second resistor which is connected in parallel to two ends of the light emitting diode.

13. The direct filtering type switching power supply according to claim 4, further comprising a second capacitor which is connected in parallel with the direct current power supply.

14. The direct filtering type switching power supply according to claim 4, wherein the light emitting diode is a light emitter in a photocoupler.

15. The direct filtering type switching power supply according to claim 5, further comprising a second resistor which is connected in parallel to two ends of the light emitting diode.

16. The direct filtering type switching power supply according to claim 8, further comprising a second resistor which is connected in parallel to two ends of the light emitting diode.

17. The direct filtering type switching power supply according to claim 5, further comprising a second capacitor which is connected in parallel with the direct current power supply.

18. The direct filtering type switching power supply according to claim 8, further comprising a second capacitor which is connected in parallel with the direct current power supply.

19. The direct filtering type switching power supply according to claim 5, wherein the light emitting diode is a light emitter in a photocoupler.

20. The direct filtering type switching power supply according to claim 8, wherein the light emitting diode is a light emitter in a photocoupler.

* * * * *